(12) United States Patent
Chimakurthy et al.

(10) Patent No.: US 12,067,629 B2
(45) Date of Patent: Aug. 20, 2024

(54) CALCULATING TAX CREDITS VALUES FROM HUMAN CAPITAL DATA

(71) Applicant: ADP, Inc., Roseland, NJ (US)

(72) Inventors: Sriranjani Chimakurthy, Hyderabad (IN); Amin Venjara, Parsippany, NJ (US); Udayakiran Garikipati, Hyberabad (IN); Arindam Das, Hyderabad (IN); Toni Lyons, Alpharetta, GA (US); Scott Francis, Atlanta, GA (US)

(73) Assignee: ADP, Inc., Roseland, NJ (US)

( * ) Notice: Subject to any disclaimer, the term of this patent is extended or adjusted under 35 U.S.C. 154(b) by 389 days.

(21) Appl. No.: 17/305,109

(22) Filed: Jun. 30, 2021

(65) Prior Publication Data
US 2023/0005078 A1 Jan. 5, 2023

(51) Int. Cl.
*G06Q 40/12* (2023.01)
*G06F 3/0482* (2013.01)
*G06Q 10/0637* (2023.01)
*G06Q 10/1057* (2023.01)
*G06Q 40/10* (2023.01)
*G06Q 50/26* (2024.01)

(52) U.S. Cl.
CPC ......... *G06Q 40/123* (2013.12); *G06F 3/0482* (2013.01); *G06Q 10/0637* (2013.01); *G06Q 10/1057* (2013.01); *G06Q 40/10* (2013.01); *G06Q 40/125* (2013.12); *G06Q 50/26* (2013.01)

(58) Field of Classification Search
None
See application file for complete search history.

(56) References Cited

U.S. PATENT DOCUMENTS

| | | | |
|---|---|---|---|
| 7,627,504 B2 * | 12/2009 | Brady | G06Q 40/00 709/219 |
| 2005/0131725 A1 * | 6/2005 | Sleeper | G06Q 10/06 715/212 |

(Continued)

OTHER PUBLICATIONS

Hamersma, Sarah. "The effects of an employer subsidy on employment outcomes: A study of the work opportunity and welfare-to-work tax credits." Journal of Policy Analysis and Management: The Journal of the Association for Public Policy Analysis and Management 27.3 (2008): 498-520 (Year: 2008).*

(Continued)

*Primary Examiner* — Darlene Garcia-Guerra
(74) *Attorney, Agent, or Firm* — Foley & Lardner LLP

(57) ABSTRACT

A method, system, and computer program code for determining a tax incentive for an employer. A set of cards is displayed on the storyboard interface. Each card is related to a particular criterion for determining and eligibility of the employer for the tax incentive. In response to receiving a selection of a particular card, a set of modal windows, including a set of data fields that are relevant to a particular criterion, is displayed on the storyboard interface. Information for the employer is identified that is relevant to the particular criterion. The set of data fields it is populated based on a portion of the information. A tax incentive amount is calculated based on the portion of the information. A document it is generated for claiming the tax incentive. The document includes the portion of the employer information and the incentive amount.

24 Claims, 17 Drawing Sheets

(56) References Cited

U.S. PATENT DOCUMENTS

| | | | | |
|---|---|---|---|---|
| 2005/0171877 A1* | 8/2005 | Weiss | ................. | G06Q 40/06 |
| | | | | 705/35 |
| 2007/0005461 A1* | 1/2007 | Lenz | ................. | G06Q 40/00 |
| | | | | 705/31 |
| 2008/0059900 A1* | 3/2008 | Murray | ............... | G06Q 50/26 |
| | | | | 715/777 |
| 2010/0191589 A1* | 7/2010 | Matte | ................. | G06Q 30/02 |
| | | | | 709/204 |
| 2012/0022984 A1* | 1/2012 | Morrison | .......... | G06Q 40/123 |
| | | | | 705/31 |
| 2012/0310799 A1* | 12/2012 | Chen | ................. | G06Q 40/00 |
| | | | | 705/31 |
| 2013/0110687 A1* | 5/2013 | M | ..................... | G06Q 40/12 |
| | | | | 705/30 |
| 2016/0239807 A1* | 8/2016 | Creighton | ....... | G06Q 10/1057 |
| 2019/0172154 A1* | 6/2019 | Lee | .................... | G06Q 40/10 |
| 2022/0156848 A1* | 5/2022 | Zavieh | .............. | G06Q 40/123 |

OTHER PUBLICATIONS

Meyer, Jack A., and Elliot K. Wicks. "A Federal Tax Credit to Encourage Employers to Offer Health Coverage." Inquiry: The Journal of Health Care Organization, Provision, and Financing 38.2 (2001): 202-213 (Year: 2001).*

Collins, Benjamin, and Sarah A. Donovan. "The work opportunity tax credit." (2018) (Year: 2018).*

* cited by examiner

STORYBOARD 400

Dashboards ⓘ ⤢

← Storyboards     💬 FEEDBACK | 📄 REFERENCE GUIDE | 📋 FAQS

Overview

Am I eligible for the CARES Act Employee Retention Credit?

Dashboards

Last Updated: September 02, 2020
As of your last payroll, your organization may be eligible for up to $333.8K in Employee Retention Tax Credits under the CARES Act.

HOW IS ELIGIBILITY DETERMINED?

Three steps guiding you through your eligibility.

Metrics

Storyboards

① AM I AN ELIGIBLE EMPLOYER? ⓘ

You *may be* considered an eligible employer if at least one of your work locations is impacted by a government-issued order.

*Of your work-location-state(s) have been impacted.* 28

[ VALIDATE WORK LOCATIONS ≫ ]

VIEW AS GUIDELINES

② DO I HAVE QUALIFIED WAGES?

Qualified wages are the wages paid to employees for time not worked since your eligibility date.

65       18
Hourly   Salaried

*Employees with estimated qualified wages.*

[ VALIDATE QUALIFIED WAGES ≫ ]

← Learn more

③ HOW DO I CLAIM THE CREDITS?

Find out what you need to do to successfully claim your estimated tax credit opportunity.

[ VIEW WAYS TO CLAIM ≫ ]

← Learn more

Benchmarks

Reports

Recent

Data Mashup

Settings

↖410 CARD    ↖412 CARD    ↖414 CARD

ⓘ Disclaimer
Estimates are based on data available to ADP (which may include your company's payroll, benefits, and/or time & attendance data) and are subject to change. ADP makes no representations or warranties regarding eligibility, credit estimates or value, savings or outcomes. Further, ADP does not provide, and this information does not constitute, legal, accounting or tax advice.

FIG. 4

MODAL WINDOW
600

| Am I an Eligible Employer? | ✕ |
|---|---|

Estimated eligibility dates
March 19, 2020 - September 02, 2020
This data range is from the earliest effective date of a government order impacting your work locations to the last expiration date of such an order across all work locations.
⊖ Learn more   ⊖ Frequently Asked Questions

👤 Employees in Total Work Locations
83
Includes hourly and salaried employees. New hires and terminated employees during shutdown duration are not included as part of your employee information.

Employee Retention Tax Credits Eligible Work Locations-State(s)*
UPDATED ON September 02, 2020

⊖ Don't see all of your employees?
Validate their work locations

☆ Indicates states with partial shutdown.   ⬤ Map View

| STATE ⇅ | STATE ⓘ SHUTDOWN DATE ⇅ | STATE REOPEN DATE ⓘ ⇅ | SHUTDOWN DURATION (DAYS) ⇅ | TOTAL EMPLOYEES ⇅ |
|---|---|---|---|---|
| California | March 19, 2020 | May 04, 2020 | 47 | 👤 0 |
| Illinois | March 21, 2020 | May 29, 2020 | 70 | 👤 0 |
| New Jersey | March 21, 2020 | June 09, 2020 | 81 | 👤 1 |
| New York | March 22, 2020 | May 28, 2020 | 68 | 👤 1 |
| Washington | March 23, 2020 | May 31, 2020 | 70 | 👤 0 |

*Source: The New York Times, CNN*

FIG. 6

MODAL WINDOW
900

Do I have Qualified Wages?                                                               ✕

Qualified wage estimates for your salaried and/or hourly employees:

⊙ How does ADP calculate your qualified wages?

⊙ Frequently Asked Questions

ⓘ Ensure no double benefits are claimed

If your organization is receiving tax credits under the Families First Coronavirus Response Act (FFCRA) or the Work Opportunity Tax Credit (WOTC), the qualified wages and tax credits shown on this storyboard will need to be refined with a tax adviser as the estimates in the storyboard do not take this into account.

⊙ Learn more

| TAB 910 | TAB 912 | TAB 914 |
|---|---|---|
| Calculate Tax Credits Estimate For Salaried Employees | Review Tax Credits Estimate for Hourly Employees | View Your Total Tax Credits Estimate |

ⓘ *Please note: Based on your projected eligibility date, calculations below includes pay dates between March 19, 2020 and September 02, 2020*

⬇ EXPORT EMPLOYEE DETAILS

Tax Credit Estimator for Salaried Employees

↻ RESET

Salaried Headcount    ? How is this calculated?

`18`

Average Wage Per Employee    ? How is this calculated?

`101326`

Average Health Plan Expenses Per Employee    ? How is this calculated?

`0`

% of Hours Not Worked*

33%

0%  ●────────●────────  100%

Tax Credits Estimate for Salaried Employees

$90K

*Example - A business may have reduced administrative staff hours by 40% but continues to pay the staff 100% of their salaried wages. In this scenario, 40% can be entered as % of of hours not worked.*

⊙ See the examples in detail

FIG. 9

MODAL WINDOW
900

Do I have Qualified Wages?                                                                                           ✕

Qualified wage estimates for your salaried and/or hourly employees:

ⓘ Ensure no double benefits are claimed

⇨ How does ADP calculate your qualified wages?

⇨ Frequently Asked Questions

If your organization is receiving tax credits under the Families First Coronavirus Response Act (FFCRA) or the Work Opportunity Tax Credit (WOTC), the qualified wages and tax credits shown on this storyboard will need to be refined with a tax adviser as the estimates in the storyboard do not take this into account.

⇨ Learn more

| TAB 910 | TAB 912 | TAB 914 |
|---|---|---|
| Calculate Tax Credits Estimate For Salaried Employees | Review Tax Credits Estimate for Hourly Employees | View Your Total Tax Credits Estimate |

| 👤 Total Employees | 💲 Total Qualified Wages ⓘ | 💵 Total Tax Credits Estimate ⓘ |
|---|---|---|
| 65 ⓘ | ~$487.6K | ~$243.8K |

ⓘ *Please note:* Based on your projected eligibility date, calculations below includes pay dates between March 19, 2020 and September 02, 2020

⬇ EXPORT EMPLOYEE DETAILS

| STATE ⇅ | # OF EMPLOYEES ⇅ | WAGES WITH HEALTH EXPENSES ⇅ | QUALIFIED WAGES WITH HEALTH EXPENSES ⇅ | ESTIMATED TAX CREDITS ⇅ |
|---|---|---|---|---|
| Illinois | 0 | ~$0 | ~$0 | ~$0 |
| Maryland | 0 | ~$0 | ~$0 | ~$0 |
| California | 0 | ~$0 | ~$0 | ~$0 |
| Texas | 0 | ~$0 | ~$0 | ~$0 |
| North Carolina | 0 | ~$0 | ~$0 | ~$0 |

FIG. 10

MODAL WINDOW
900

| Do I have Qualified Wages? | ✕ |
|---|---|

Qualified wage estimates for your salaried and/or hourly employees:

⊙ How does ADP calculate your qualified wages?

⊙ Frequently Asked Questions

ⓘ Ensure no double benefits are claimed

If your organization is receiving tax credits under the Families First Coronavirus Response Act (FFCRA) or the Work Opportunity Tax Credit (WOTC), the qualified wages and tax credits shown on this storyboard will need to be refined with a tax adviser as the estimates in the storyboard do not take this into account.

⊙ Learn more

| Tab 910 | Tab 912 | TAB 914 |
|---|---|---|
| Calculate Tax Credits Estimate For Salaried Employees | Review Tax Credits Estimate for Hourly Employees | View Your Total Tax Credits Estimate |

Your Total Estimated Tax Credit is $333.8K.

ⓘ *Please note:* Based on your projected eligibility date, calculations below includes pay dates between March 19, 2020 and September 02, 2020

Your Credit Breakup

| TAX CREDIT TYPE | ESTIMATED TAX CREDIT |
|---|---|
| Salaried Employees Tax Credit<br>• Salaried Employees 18<br>• Average Employee Wage $101,326<br>• Average Health Plan Expenses Per Employee $0<br>• % of Hours Not Worked 10% | $90K |
| Hourly Employees Tax Credit<br>• Hourly Employees 65<br>• Qualified Wages Paid $487.6K<br>• Qualified Health Plan Expenses $0 | $243.8K |
| 💵 Total Estimated Tax Credit<br>⬇ EXPORT TO EXCEL | $333.8K |

Your next step
Find out what you need to do to successfully claim your total estimated tax credit opportunity.

( VIEW WAYS TO CLAIM » )

FIG. 11

MODAL WINDOW 1200

Employee Retention Tax Credits

Your Employee Retention Tax Credits estimate

$333.8K (as of September 02, 2020)

Comprises of:
18 salaried employees
65 hourly employees
$667.6K in qualified wages

⬇ EXPORT TO EXCEL

We noticed in your payroll system you posted

$0 (as of August 30, 2020)

under the following memo codes:

1RW CARES Employee Retention - Wage Credit

1RH CARES Employee Retention - Health Expense Credit

Help me claim my credit

Ⓐ Connect with us!

In 2019, ADP helped thousands of clients capture $1 billion in aggregate tax credits and incentives.

⬆ Contact ADP Tax Credit Services

⑧ Speak to your tax advisor

Export your summary report above and provide it to your tax adviser for review. In addition, see IRS guidance on how to claim and file.

⬆ IRS CARES ACT ERC Guidance

⌨ Claim the credit yourself

Track the credit amounts specific to the Employee Retention Credit by entering this information within the appropriate memo codes in your Payroll system.

⬆ Learn how

FIG. 12

CALCULATING TAX CREDITS VALUES FROM HUMAN CAPITAL DATA

BACKGROUND

1. Field

The disclosure relates generally to an improved computer system and, more specifically, to a method, apparatus, computer system, and computer program product for automatically calculating tax credits values based on data from human capital management systems.

2. Description of the Related Art

Information systems are used for many different purposes. For example, an information system may be used by a human resources department to maintain benefits and other records about employees. For example, the human resources department may manage health insurance, wellness plans, and other programs in an organization using the information system.

As another example, the information system may be used to run a payroll to generate paychecks for the employees in the organization. The information system in the form of a payroll processing system performs functions, such as calculating salary payments, bonuses, deductions, withholdings, taxes, and other suitable functions involved with running the payroll for the organization.

Different: departments in the organization may have responsibilities that impact payroll processing. For example, a benefits department in the organization may have a retirement benefits policy that is used to manage retirement benefits. This department may manage eligibility, vesting schedules, withholdings, and other items relating to the retirement benefits.

As another example, the human resources department may have a policy for uniform benefits. The human resources department may identify which employees may be eligible to receive a uniform allowance for dress codes for a particular position. The policy may define who is eligible for a uniform allowance, how claims are submitted, and how credits may be obtained.

Different policies in the different departments result in reimbursements, deductions, bonuses, and other items that are taken into account when processing tax liability for the organization. Determining a tax liability for the organization based on the policies of the different departments in the organization is complex and time-consuming. For example, for organizations having different geographic locations, the tax liability may be dependent on laws for a particular geographic location, such as a city, a state, or a country.

Therefore, it would be desirable to have a method and apparatus that take into account at least some of the issues discussed above, as well as other possible issues. For example, it would be desirable to have a method and apparatus that overcome a technical problem with the complexity of configuring an information system to for automatically calculate tax credits values based on data from human capital management systems.

SUMMARY

According to one embodiment of the present invention, a method provides for determining a tax incentive for an employer. The method includes displaying, on a storyboard interface, a set of cards. Each card of the set of cards is related to a particular criterion of a set of criteria for determining and eligibility of the employer for the tax incentive. The method includes sequentially displaying a set of modal windows on the storyboard interface in response to receiving a selection of a particular card. The set of modal windows include a set of data fields that are relevant to a particular criterion. The method includes identifying information for the employer that is relevant to the particular criterion. The method includes populating the set of data fields based on a portion of the information. The method includes calculating a tax incentive amount based on the portion of the information. The method includes generating a document for claiming the tax incentive. The document including the portion of the employer information and the incentive amount.

According to another embodiment of the present invention, a computer system comprises a hardware processor, an incentive calculator executing on the hardware processor, and a display system having a storyboard interface. A set of cards is displayed on the storyboard interface set of cards. Each card of the set of cards is related to a particular criterion of a set of criteria for determining and eligibility of the employer for the tax incentive. In response to receiving a selection of a particular card, a set of modal windows is displayed on the storyboard interface. The set of modal windows include a set of data fields that are relevant to a particular criterion. Information for the employer is identified that is relevant to the particular criterion. The set of data fields it is populated based on a portion of the information. A tax incentive amount is calculated based on the portion of the information. A document it is generated for claiming the tax incentive. The document including the portion of the employer information and the incentive amount.

According to yet another embodiment of the present invention, a computer program product comprises a computer-readable storage media with program code stored on the computer-readable storage media for determining a tax incentive for an employer. The program code is executable by a computer system: to display, on a storyboard interface, a set of cards, wherein each card of the set of cards is related to a particular criterion of a set of criteria for determining and eligibility of the employer for the tax incentive; responsive to receiving a selection of a particular card, to display sequentially a set of modal windows on the storyboard interface, wherein the set of modal windows include a set of data fields that are relevant to a particular criterion; to identify information for the employer that is relevant to the particular criterion; to populate the set of data fields based on a portion of the information; to calculate a tax incentive amount based on the portion of the information; and to generate a document for claiming the tax incentive, the document including the portion of the employer information and the incentive amount.

BRIEF DESCRIPTION OF THE DRAWINGS

FIG. 4 is an illustration of a storyboard interface shown in accordance with an illustrative embodiment;

FIG. 6 is a second modal window for display over a storyboard interface shown according to an illustrative embodiment;

FIG. 9 is a first tab of a fourth modal window for display over a storyboard interface shown according to an illustrative embodiment;

FIG. 10 is a second tab of a fourth modal window for display over a storyboard interface shown according to an illustrative embodiment;

FIG. 11 is a third tab of a fourth modal window for display over a storyboard interface shown according to an illustrative embodiment;

FIG. 12 is a fifth modal window for display over a storyboard interface shown according to an illustrative embodiment;

DETAILED DESCRIPTION

The illustrative embodiments recognize and take into account one or more different considerations. For example, the illustrative embodiments recognize and take into account traditional accounting and tax software may not informed employers of certain tax incentives. As a result, employers utilizing these traditional accounting and tax software may not understand whether they are eligible for certain tax incentives, as well as an incentive amount which they can claim.

The illustrative embodiments further recognize and take into account that it would be desirable to have a method, apparatus, computer system, and computer program product that takes into account the issues discussed above as well as other possible issues. For example, it would be desirable to have a method, apparatus, computer system, and computer program product that can retrieved data for multiple systems, and enable the employer to understand individualized tax credits that they may be eligible.

Thus, the illustrative embodiments provide a method, computer system, and computer program product for determining a tax incentive for an employer. A set of cards is displayed on the storyboard interface set of cards. Each card of the set of cards is related to a particular criterion of a set of criteria for determining and eligibility of the employer for the tax incentive. In response to receiving a selection of a particular card, a set of modal windows is displayed on the storyboard interface. The set of modal windows include a set of data fields that are relevant to a particular criterion. Information for the employer is identified that is relevant to the particular criterion. The set of data fields it is populated based on a portion of the information. A tax incentive amount is calculated based on the portion of the information. A document it is generated for claiming the tax incentive. The document including the portion of the employer information and the incentive amount.

Figure 1:
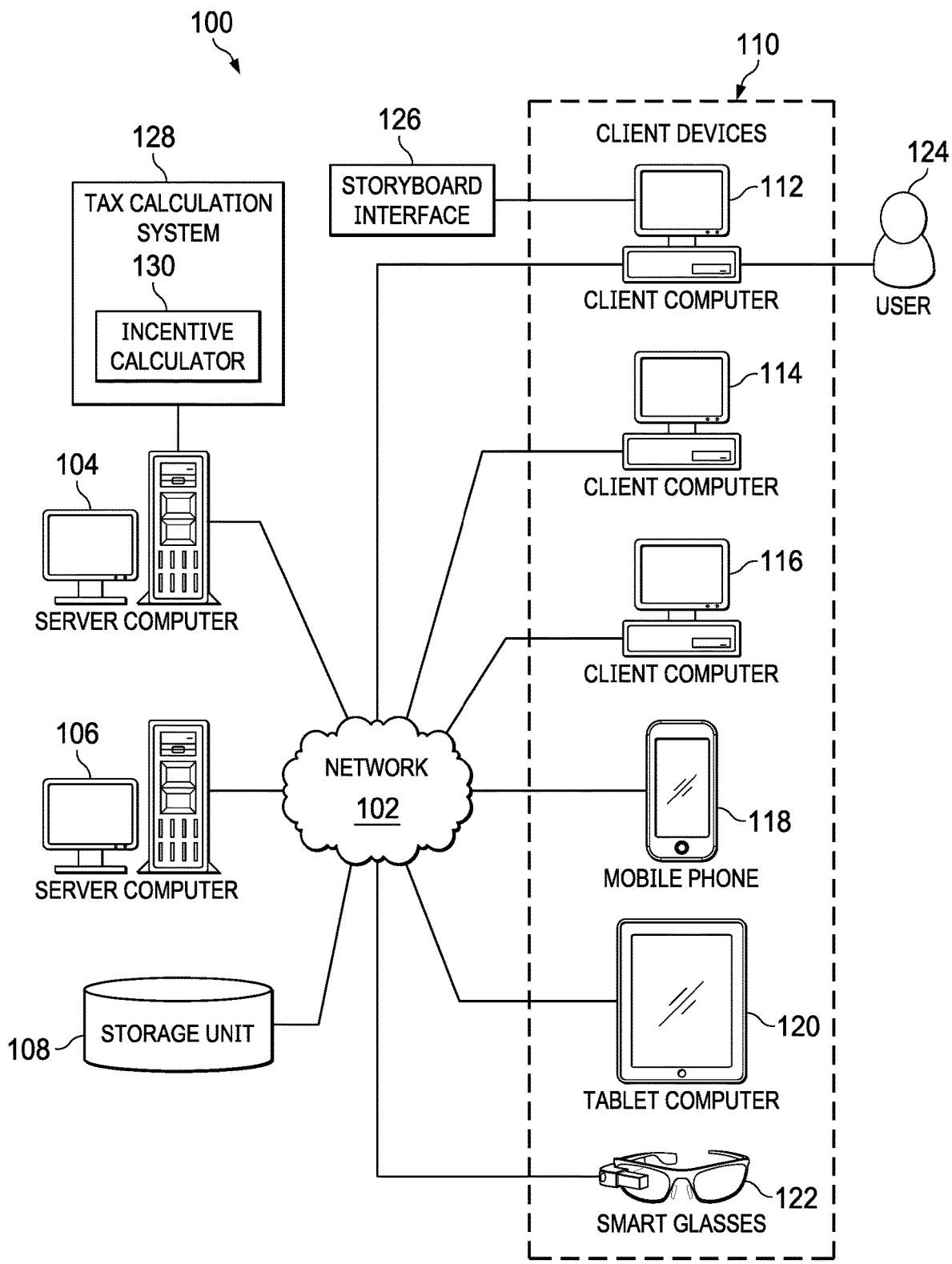
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed if data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 124 operates client computer 112. As depicted, user 124 use a storyboard interface 126 to interact with tax calculation system 128 having incentive calculator 130. In the illustrative example, storyboard interface 126, together with incentive calculator 130, can generate visual guidance for determining an employer's eligibility for a tax incentive, and an amount of thereof, in response to receiving user input from user 124.

In this illustrative example, incentive calculator 130 can run on server computer 104. In another illustrative example, incentive calculator 130 can be run in a remote location such as on client computer 114 and can take the form of a system instance of the application. In yet other illustrative examples, incentive calculator 130 can be distributed in multiple locations within network data processing system 100. For example, incentive calculator 130 can run on client computer 112 and on client computer 114 or on client computer 112 and server computer 104 depending on the particular implementation.

Together with storyboard interface 126, incentive calculator 130 can operate to determining a tax incentive for an employer. A set of cards is displayed on the storyboard interface 126. Each card of the set of cards is related to a particular criterion of a set of criteria for determining an eligibility of the employer for the tax incentive. In response to receiving a selection of a particular card, a set of modal windows is displayed on the storyboard interface 126. The set of modal windows include a set of data fields that are relevant to a particular criterion. Information for the employer is identified that is relevant to the particular criterion. The set of data fields it is populated based on a portion of the information. A tax incentive amount is calculated based on the portion of the information. Incentive calculator can then generate a document for claiming the tax incentive. The document includes the portion of the employer information and the incentive amount.

Figure 2:
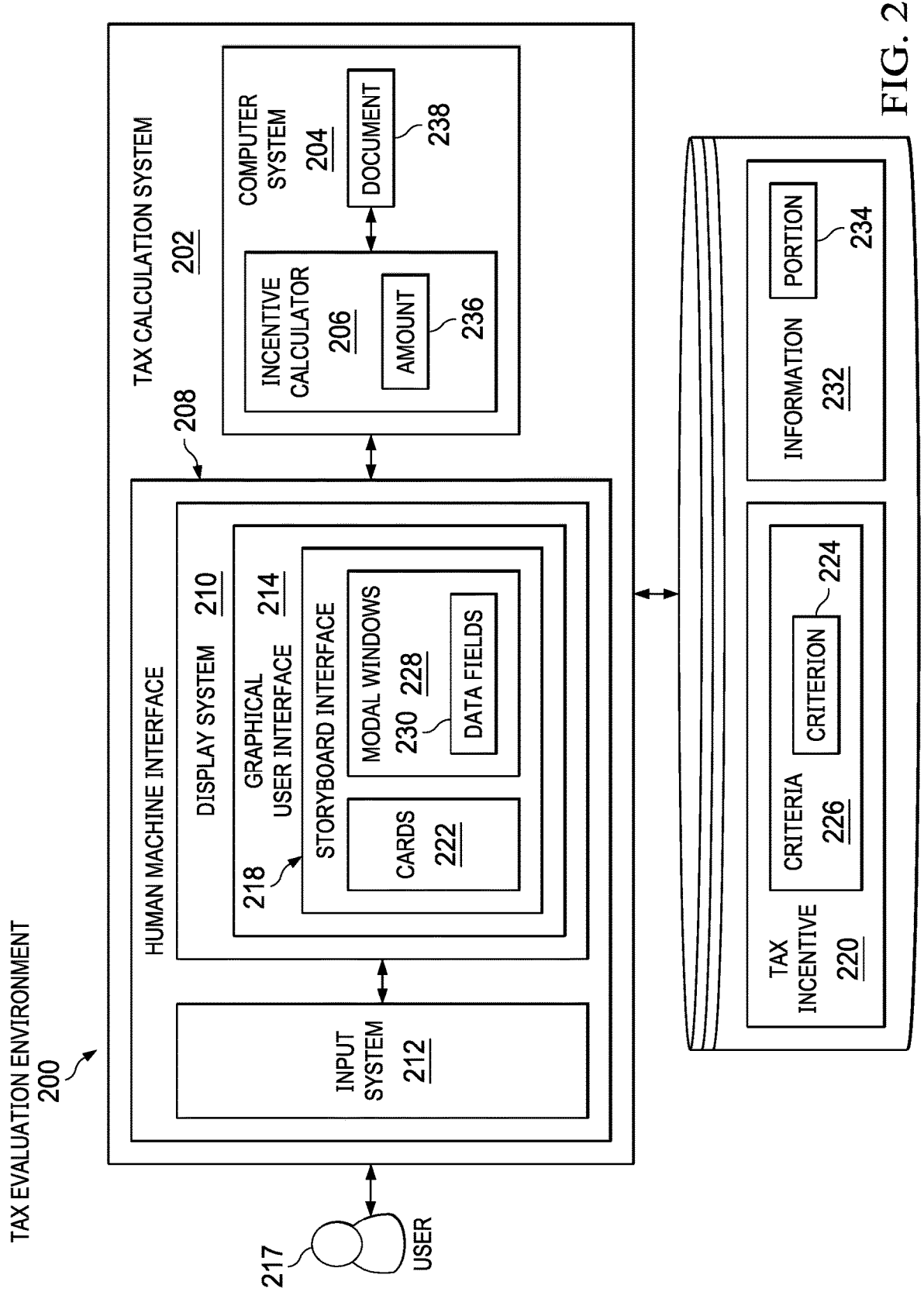
FIG. 2 is a block diagram of a tax evaluation environment depicted in accordance with an illustrative embodiment.

With reference now to FIG. 2, a block diagram of a tax evaluation environment is depicted in accordance with an illustrative embodiment. In this illustrative example, tax evaluation environment 200 includes components that can be implemented in hardware such as the hardware shown in network data processing system 100 in FIG. 1.

In this illustrative example, tax calculation system 202 in tax evaluation environment 200 can retrieve data for multiple systems, and display individualized tax incentives to the employer in a storyboard interface that enables and easier understanding of tax incentives.

As depicted, tax calculation system 202 comprises computer system 204 and incentive calculator 206. Incentive calculator 206 runs in computer system 204. Incentive calculator 206 can be implemented in software, hardware, firmware, or a combination thereof. When software is used, the operations performed by incentive calculator 206 can be implemented in program code configured to run on hardware, such as a processor unit. When firmware is used, the operations performed by incentive calculator 206 can be implemented in program code and data and stored in persistent memory to run on a processor unit. When hardware is employed, the hardware may include circuits that operate to perform the operations in incentive calculator 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 217 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 208 can enable user 217 to interact with one or more computers or other types of computing devices in computer system 204. For example, these computing devices can be client devices such as client devices 110 in FIG. 1.

As depicted, graphical user interface 214 can be storyboard interface 218. Storyboard interface 218 is a user interface is that organizes the process of determining a tax incentive in the form of illustrations or images displayed in sequence.

Storyboard interface 218 solves problems of prior graphical user interface devices (GUIs), in the context of computerized taxation determination, relating to speed, accuracy, and usability. Rather than reciting a mathematical algorithm, a fundamental economic or longstanding commercial practice, or a challenge in business, storyboard interface 218 improves on existing graphical user interface devices that do not have no pre-electronic taxation analog. The embodiments of storyboard interface 218 provide significantly more than prior graphical user interface devices that merely allow for setting, displaying, and selecting data or information that is visible on a graphical user interface device. Instead, storyboard interface 218 utilizes a specific, structured interface directly related a prescribed functionality that resolves a specifically identified problem of recognizing tax incentives for which an employer may be eligible.

Furthermore, the specific structure and concordant functionality of storyboard interface 218 distinguishes this system as compared to conventional computer implementations of known procedures. The function of storyboard interface 218 is not simply the generalized use of computer system 204 as a tool to conduct a known or obvious process. Instead, storyboard interface 218 provides an inventive concept that allows traders to visualize tax incentives more efficiently and accurately as well as generate documents for claiming these incentives. Rather than the routine or conventional use of computers or the Internet, storyboard interface 218 overcomes problems that are necessarily rooted in computer technology and that specifically arise in the realm of computer networks, resulting in an improvement to the capabilities of tax calculation system 202.

In this illustrative example, incentive calculator 206 in computer system 204 is configured to determine a tax incentive 220 for an employer. Tax incentive 220 can be, for example, one or more of a credit, a deduction, or an exemption. As used herein, a tax credit is a tax incentive which allows certain taxpayers to subtract the amount of the credit from the total they owe the state. It may also be a credit granted in recognition of taxes already paid or a form of state support. In contrast to a tax credit, a tax deduction is a reduction of income that is able to be taxed and is commonly a result of expenses, particularly those incurred to produce additional income. The difference between deductions, exemptions and credits is that deductions and exemptions both reduce taxable income, while credits reduce tax.

Incentive calculator 206 is configured to display a set of cards 222 on a storyboard interface 218. Each card of the set of cards 222 is related to a particular criterion 224 of a set of criteria 226 for determining an eligibility for the tax incentive.

Responsive to receiving a selection of a particular card, Incentive calculator 206 sequentially displays a set of modal windows 228 on the storyboard interface 218. As used herein, a "modal window" is an element that sits on top of an application's main window. It creates a mode that disables the main window but keeps it visible with the modal window as a child window in front of it. Users must interact with the modal window before they can return to the parent application. The set of modal windows 228 include a set of data fields 230 that are relevant to a particular criterion 224 of the tax incentive 220.

Incentive calculator 206 identifies information 232 for the employer that is relevant to the particular criterion 224, and populates the set of data fields 230 based on a portion 234 of the information 232. Incentive calculator 206 calculates an incentive amount 236 based on the portion 234 of the information 232.

Incentive calculator 206 generates a document 238 for claiming the tax incentive 220. Document 238 includes the portion 234 of the information 232 for the employer and the incentive amount 236. In one example, document 238 is a spreadsheet file that provides complete details and calculations for the incentive amount 236 at an employee level. In another example, document 238 is an Internal Revenue Service tax form, suitable for filing in either a paper or electronic format.

In one illustrative example, one or more solutions are present that overcome a problem with understanding tax incentives and the related calculations in tax software. As a result, one or more illustrative examples may provide assistance in the form of cards 222. Cards 222 are generated based on portion 234 of information 232 in a manner that provides the visual guidance in a context of a tax incentive 220.

Computer system 204 can be configured to perform at least one of the steps, operations, or actions described in the different illustrative examples using software, hardware, firmware, or a combination thereof. As a result, computer system 204 operates as a special purpose computer system in incentive calculator 206 in computer system 204. In particular, incentive calculator 206 and storyboard interface 218 transform computer system 204 into a special purpose computer system as compared to currently available general computer systems that do not have incentive calculator 206 and storyboard interface 218. In this example, computer system 204 operates as a tool that can increase at least one of speed, accuracy, or usability of computer system 204. In particular, this increase in performance of computer system 204 can be for the use of tax software by user 217.

Figure 3:
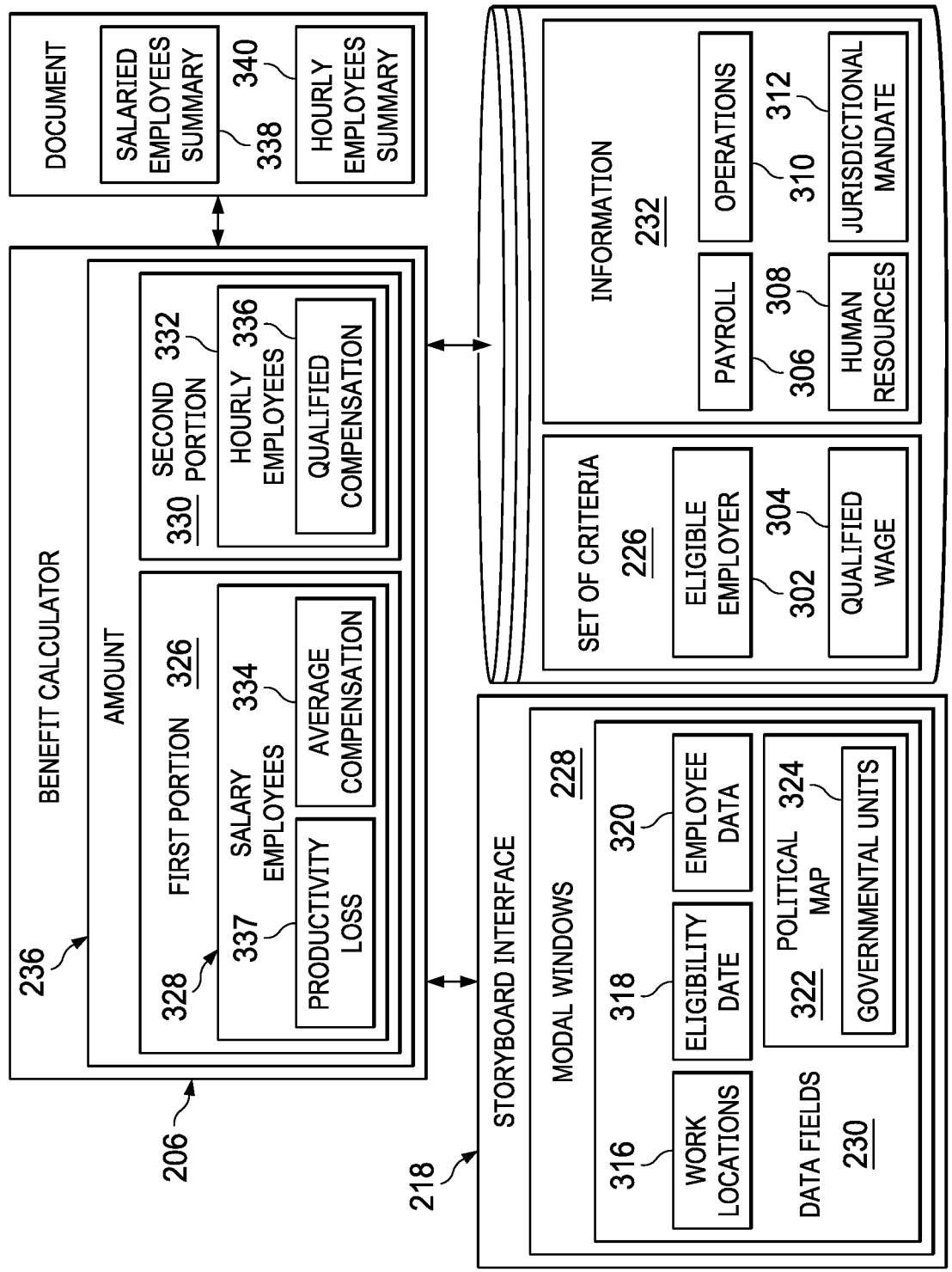
FIG. 3 a block diagram of a particular use case of a tax evaluation environment depicted in accordance with an illustrative embodiment.

With reference now to FIG. 3, a block diagram of a particular use case of a tax evaluation environment is depicted in accordance with an illustrative embodiment. In this illustrative example, tax evaluation environment 300 includes components that can be implemented to determine a tax incentive under the Coronavirus Aid, Relief, and Economic Security Act.

As depicted, the set of criteria 226 includes an eligible employer 302 criterion and a qualified wage criterion 304. Under the Coronavirus Aid, Relief, and Economic Security Act, employers, including tax-exempt organizations, are eligible for the credit if they operate a trade or business during a calendar year and experience either: (a) the full or partial suspension of the operation of their trade or business during any calendar quarter because of governmental orders limiting commerce, travel, or group meetings due to COVID-19; or (b) a significant decline in gross receipts.

Determining either of a suspension of operations or a significant decline in gross receipts may require information from a number of different sources. For example, information 232 that is relevant to a particular criterion may be generated and maintained by a number of different systems, such as payroll, human resources, operations, accounting, and combinations thereof. Furthermore, jurisdictional mandates may be found outside of an employer's organization. In an illustrative example, incentive calculator 206 can retrieve information, such as payroll 306, human resources 308, operation 310, and jurisdictional mandate 312, from a number of disparate sources, and record them in a centralized location.

As depicted, data fields 230 include work locations 316, eligibility date 318, and employee data 320. In one illustrative example, the set of modal windows 228 is relevant to the eligible employer 302 criterion. Incentive calculator 206 populates eligibility date 318 for the tax incentive based on the jurisdictional mandate 312. Incentive calculator 206 populates work locations 316 for the employer based on the human resources 308 information. Incentive calculator 206 populates employee data 320 based on the payroll 306 information and the human resources 308 information.

In one illustrative example, the set of modal windows includes a political map 322 for a set of governmental units 324. As used herein, a "political map" is a map that shows the geographic boundaries between governmental units such as countries, states, and counties. Incentive calculator 206 distinguishes particular ones of governmental units 324 within political map 322 based on an overlap of the operations 310 information and the jurisdictional mandate 312. For example, jurisdictions in which the employer is doing business and have been affected by a shutdown order may be visually distinguished from other jurisdictions, such as by displaying governmental units 324 in one or more different colors.

In one illustrative example, calculating the tax incentive further comprises calculating a first portion 326 of the tax incentive based on a number of salaried employees 328; and calculating a second portion 330 of the tax incentive based on a number of hourly employees 332. Under the Coronavirus Aid, Relief, and Economic Security Act, salaried employees and hourly employees are treated differently for the purpose of determining the tax credit amount.

Incentive calculator 206 separately determines first portion 326 and second portion 330. For example, incentive calculator 206 calculates the first portion of the tax incentive amount by identifying the number of salaried employees within a jurisdiction having a jurisdictional mandate. Salaried employees can be identified, for example, from human resources 308 information. Incentive calculator 206 then determines an average compensation 334 for the number of salaried employees. As used herein, "compensation" can include one or more of wages and benefits paid to the employees of an organization.

incentive calculator 206 determines a productivity loss to the employer for the number of salaried employees. incentive calculator 206 calculates the tax incentive amount based, at least in part, on the number of salaried employees, the average compensation 334, and the productivity loss 337. In this illustrative example, incentive calculator 206 can generate document 238 that includes a salaried employees summary 338 that includes the first portion 326 of the tax incentive, the number of salaried employees 328, an average compensation 334, and a productivity loss 337.

Incentive calculator 206 determines the second portion of the tax incentive amount by identifying the number of hourly employees within a governmental unit having a jurisdictional mandate 312. Hourly employees 332 can be identified, for example, from payroll 306 information, which can be retrieved from a timeclock system.

Incentive calculator 206 identifies a qualified compensation paid to the number of hourly employees. Incentive calculator 206 calculates the tax incentive based, at least in part, on the number of hourly employees and the qualified compensation 336. In this illustrative example, incentive calculator 206 can generate document 238 that includes an hourly employees summary 340 that includes the second portion 330 of the tax incentive, the number of hourly employees 332, and a qualified compensation 336.

Under the Coronavirus Aid, Relief, and Economic Security Act, the definition of qualified wages depends on how many employees an eligible employer has. If an employer averaged more than one hundred full-time employees, qualified wages are generally those wages, including certain health care costs, paid to employees that are not providing services because operations were suspended or due to the decline in gross receipts. However, if an employer averaged one hundred or fewer full-time employees, qualified wages are those wages, including health care costs, paid to any employee during the period operations were suspended or the period of the decline in gross receipts, regardless of whether or not its employees are providing services.

The illustration of tax evaluation environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Turning now to FIGS. 4-12, illustrations of a storyboard interface are shown in accordance with an illustrative embodiment. As depicted, storyboard 400 is an example one implementation for storyboard interface 126 in FIG. 1 and storyboard interface 218 in FIG. 2. In this illustrative example, storyboard 400 includes cards and modals that can be implemented to determine a tax incentive under the Coronavirus Aid, Relief, and Economic Security Act.

Storyboard 400 provides an innovative interface for determining and eligibility for a tax incentive. storyboard 400 organizes the process of determining a tax incentive in the form of card 410, 412, and 414, displayed in sequence.

Figure 5:
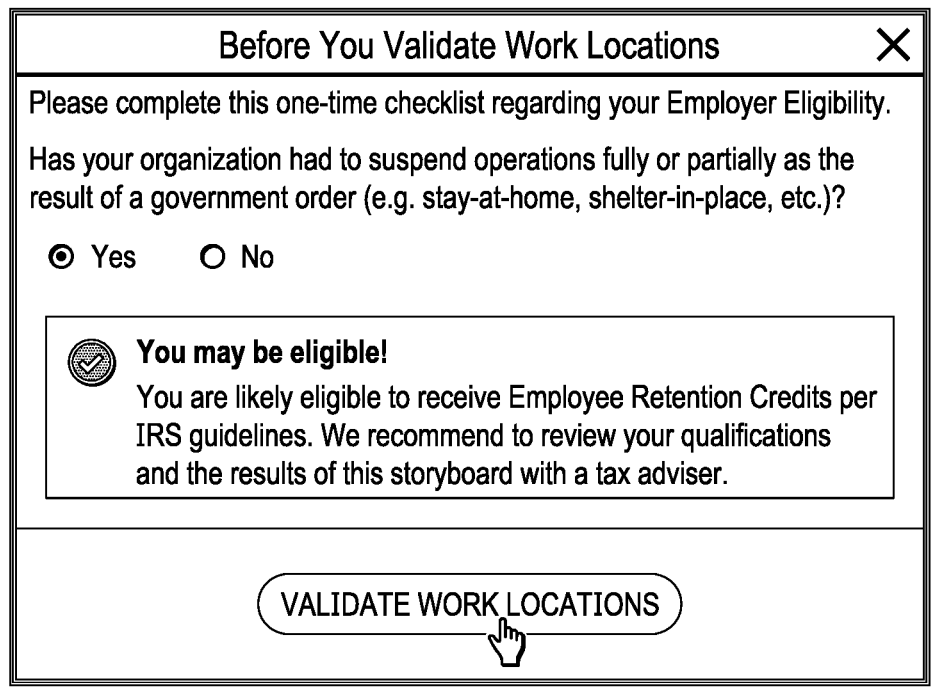
FIG. 5 is a first modal window for display over a storyboard interface shown according to an illustrative embodiment.

Referring now to FIG. 5, a first modal window for display over a storyboard interface is shown according to an illustrative embodiment. Modal window 500 can be displayed in response to selection of card 410 of FIG. 4. Modal window 500 provides employers the possibility to check if they are an eligible employer based on a few questions, for example, questions related to operation shut down or a significant decline in gross receipts.

Referring now to FIG. 6, a second modal window for display over a storyboard interface is shown according to an illustrative embodiment. Modal window 600 can be displayed in response to selection of card 410 of FIG. 4.

Modal window 600 provides information related to jurisdictional orders, enabling an employer to determine if they became an eligible for the tax credit based on a statewide shutdown order or stay at home order, as well as reopen dates across their geographic work locations. As depicted, modal window 600 shows key information such as a shutdown order effective date, a reopen date, and a number of days in shutdown. Additionally, modal window 600 provides a detailed list of employees working in those locations, including their names, departments, manager, and pay type.

Figure 7:
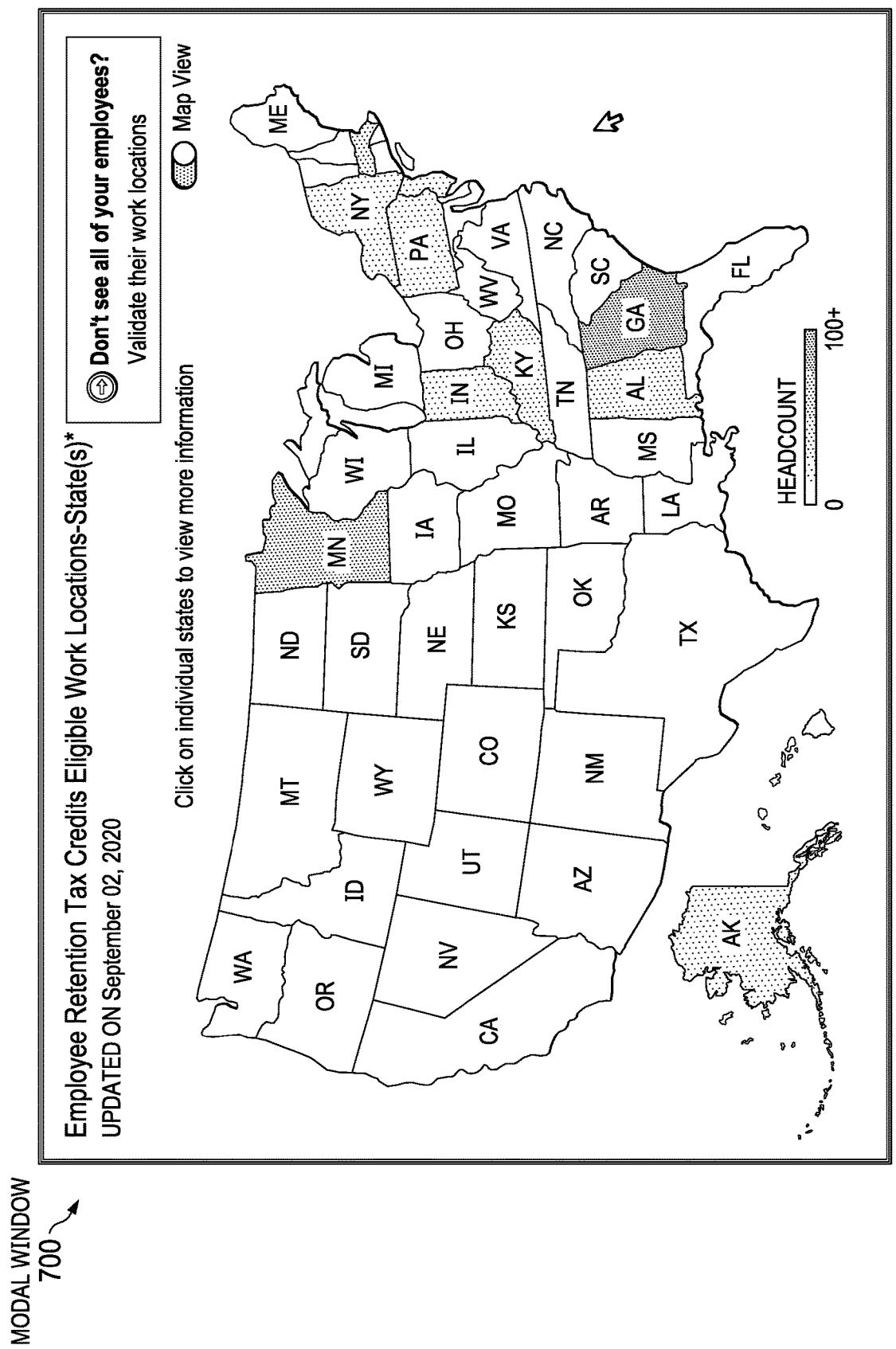
FIG. 7 is a third modal window for display over a storyboard interface shown according to an illustrative embodiment.
Figure 8:
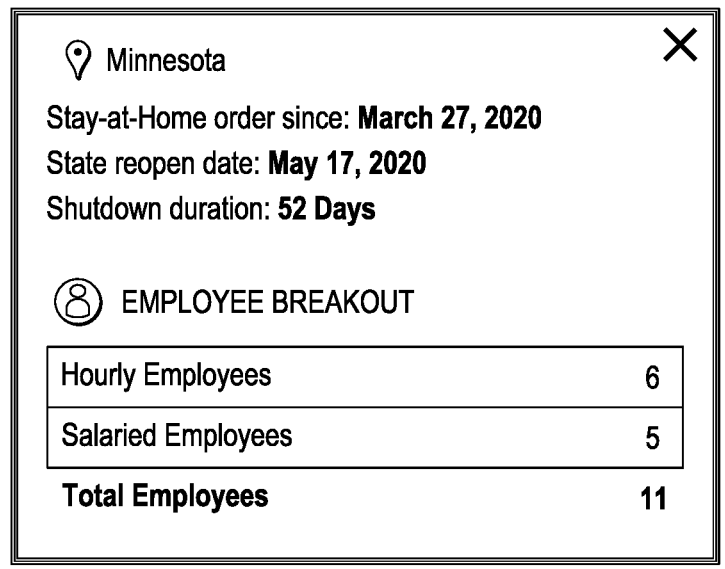
FIG. 8 is a pop-up window for display over a storyboard interface shown according to an illustrative embodiment.

Referring now to FIGS. 7 and 8, a third modal window and pop-up window for display over a storyboard interface is shown according to an illustrative embodiment. Modal window 700 is a political map, and can be accessed by selecting a "map view" from modal window 600 of FIG. 6. Pop-up window 800 can be displayed by selecting a corresponding jurisdiction from the political map of modal window 700.

Referring now to FIGS. 9-11, a fourth modal window for display over a storyboard interface is shown according to an illustrative embodiment. Modal window 900 can be displayed in response to selection of card 412 of FIG. 4.

Modal window 900 provides employers details of wages that are qualified wages for claiming a tax incentive under the Coronavirus Aid, Relief, and Economic Security Act. As depicted, modal window 900 includes tabs 910, 912, and 914.

With reference in particular to FIG. 9, tab 910 is selected, showing calculations for tax credits for salaried employees. Storyboard 400 includes an inbuilt calculator for estimating credits for salaried employees. In tab 910, employers can see the average compensation being paid to the employees, including wages and healthcare expenses. Wages and healthcare expenses can be identified from one or more different sources, such as payroll systems and human resources systems, where different data sets can be maintained.

With reference now to FIG. 10, tab 912 is selected, showing calculations for tax credits for hourly employees. For hourly employees, storyboard 400 does a complete calculation based on actual hours worked by the employees, and the hours for which the employee has been paid. Information can be identified from one or more different sources. For example, actual hours worked by the employees can be sourced from a timeclock system, while the hours for which the employee has been paid can be sourced from a payroll system. In the event that actual hours information cannot be located, the inbuilt calculator can be surfaced, allowing an employer to select a percentage of hours that the employee has not worked, but for which the employee has still been paid.

With reference now to FIG. 11, tab 914 is selected, showing a summary of hourly employees, including qualified wages, and their estimated tax credits. A summary of salaried employees is separately shown, including their qualified wages and estimated credits. A total of the eligible credits, summoned from both the hourly and salaried employees, is also shown.

Referring now to FIG. 12, a fifth modal window for display over a storyboard interface is shown according to an illustrative embodiment. Modal window 1200 can be displayed in response to selection of card 414 of FIG. 4.

Modal window 1200 provides a summary of estimated credits, as well as credits that an employer may have already obtained through payroll. From modal window 1200, an employer can generate a document that provides details and calculations of the tax credit at an employee level.

The illustrations of graphical user interface in FIGS. 4-12 are provided as one illustrative example of an implementation for determining a tax incentive and are not meant to limit the manner in which the storyboard interface can be generated and presented in other illustrative examples. In one example, for example, one or more of modal windows 500, 600, 700, 900 and 1200 can be minimized, resized, or closed to enable viewing of one or more card 410, 412, and 414.

Figure 13:
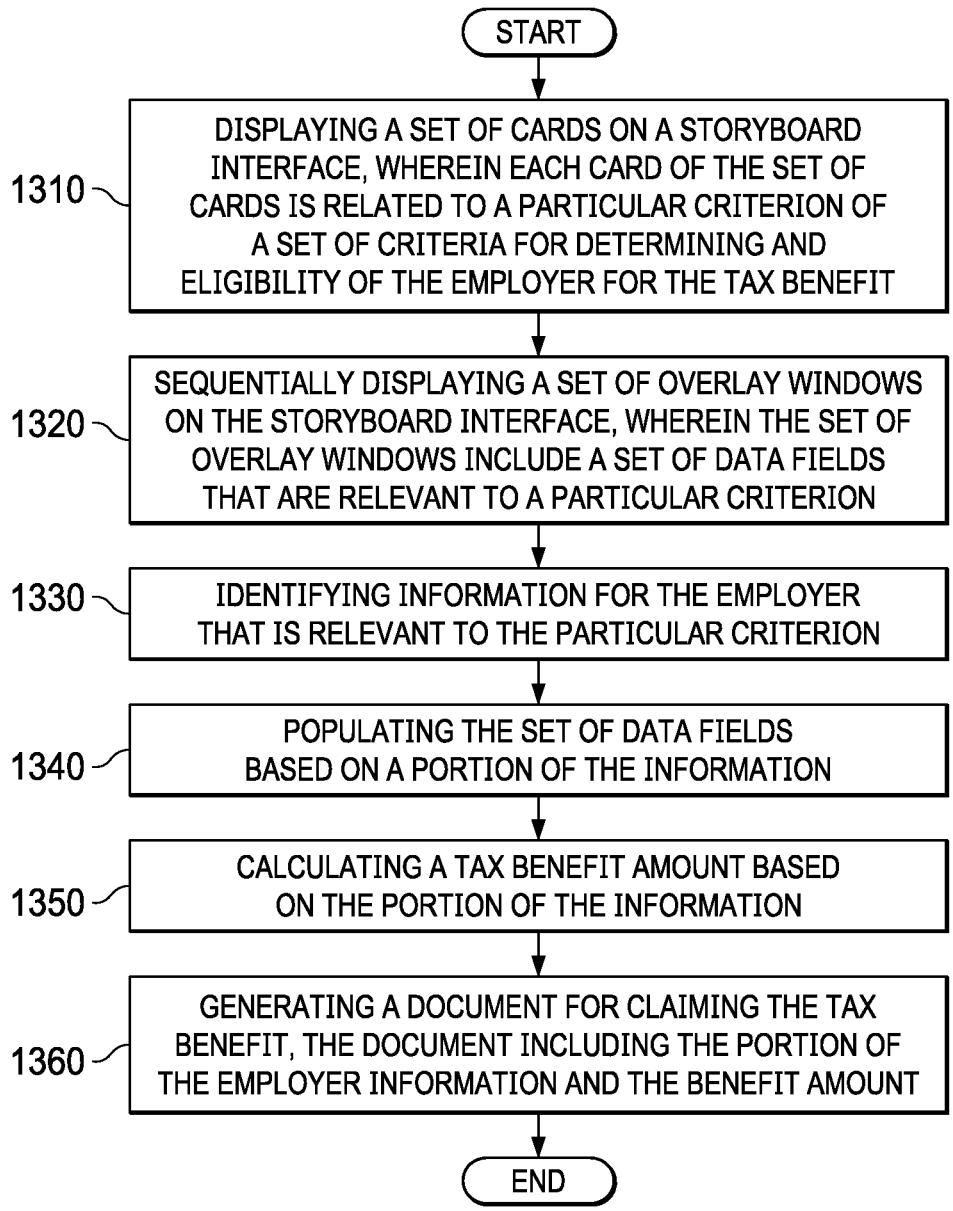
FIG. 13 a flowchart of a process for determining a tax incentive for an employer is depicted in accordance with an illustrative embodiment.

Turning next to FIG. 13, a flowchart of a process for determining a tax incentive for an employer is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in incentive calculator 206 and storyboard interface 218 of computer system 204 in FIG. 2.

The process begins by displaying a set of cards on a storyboard interface (step 1310). Each card of the set of cards is related to a particular criterion of a set of criteria for determining and eligibility of the employer for the tax incentive.

Responsive to receiving a selection of a particular card, the process sequentially displays a set of modal windows on the storyboard interface (step 1320). The set of modal windows include a set of data fields that are relevant to a particular criterion.

The process identifies information for the employer that is relevant to the particular criterion (step 1330) and populates the set of data fields based on a portion of the information (step 1340).

The process calculates a tax incentive amount based on the portion of the information (step 1350).

The process generates a document for claiming the tax incentive, including the portion of the employer (step 1360). The process terminates thereafter.

Figure 14:
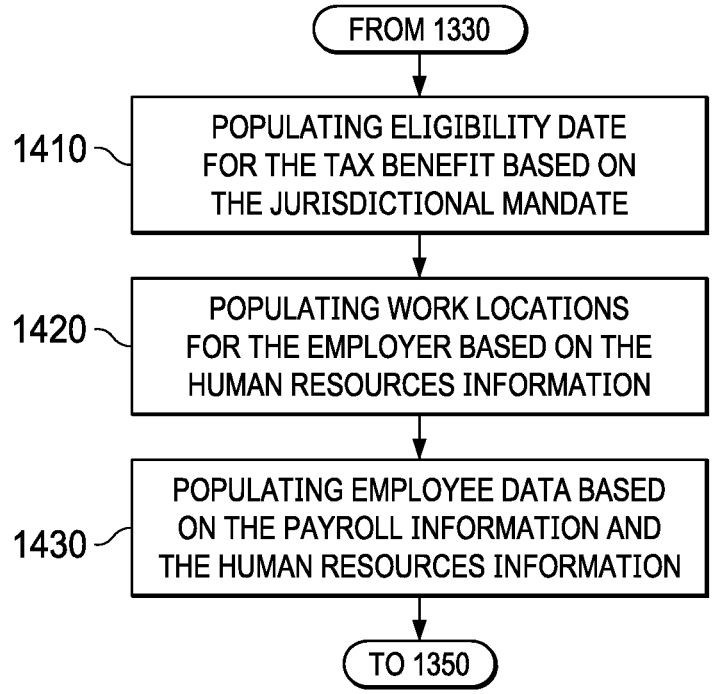
FIG. 14 a flowchart of a process for populating a set of data fields is depicted in accordance with an illustrative embodiment.

With reference next to FIG. 14, a flowchart of a process for populating a set of data fields is depicted in accordance with an illustrative embodiment. The process in FIG. 14 is an example one implementation for step 1340 in FIG. 13.

Continuing from step 1330 of FIG. 13, the process populates eligibility date for the tax incentive based on the jurisdictional mandate (step 1410). The process populates work locations for the employer based on the human resources information (step 1420). The process populates employee data based on the payroll information and the human resources information (step 1430). Thereafter, the process continues to step 1350 of FIG. 13.

Figure 15:
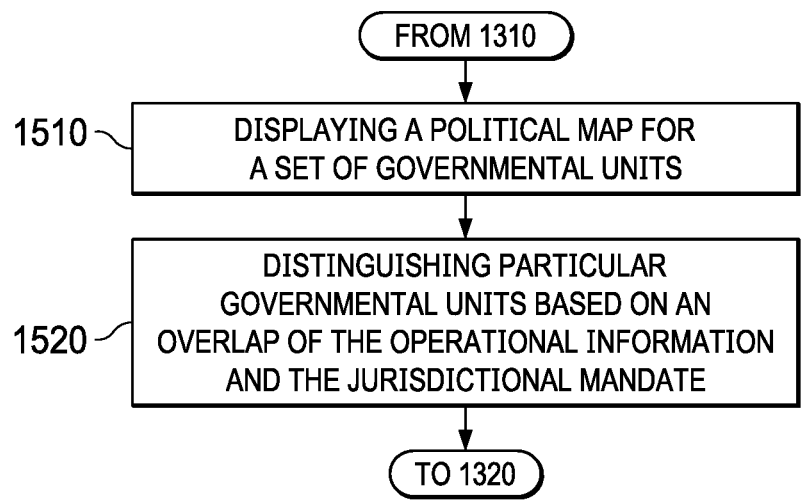
FIG. 15 a flowchart of a process for displaying a set of modal windows is depicted in accordance with an illustrative embodiment.

With reference next to FIG. 15, a flowchart of a process for displaying a set of modal windows is depicted in accordance with an illustrative embodiment. The process in FIG. 15 is an example one implementation for step 1320 in FIG. 13.

Continuing from step 1310 of FIG. 13, the process displays a political map for a set of governmental units (step 1510). The process distinguishes particular governmental units based on an overlap of the operational information and the jurisdictional mandate (step 1520). Thereafter, the process continues to step 1330 of FIG. 13.

Figure 16:
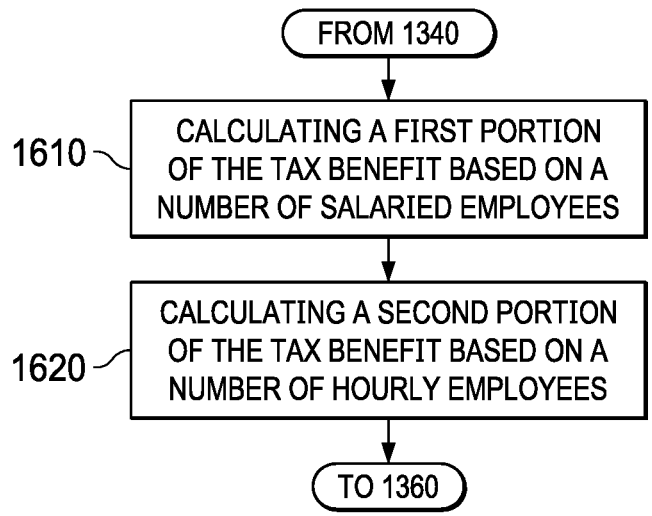
FIG. 16 a flowchart of a process for calculating a tax incentive is depicted in accordance with an illustrative embodiment.

With reference next to FIG. 16, a flowchart of a process for calculating a tax incentive is depicted in accordance with an illustrative embodiment. The process in FIG. 16 is an example one implementation for step 1350 in FIG. 13.

Continuing from step 1340 of FIG. 13, The process calculates a first portion of the tax incentive based on a number of salaried employees (step 1610). The process calculates a second portion of the tax incentive based on a number of hourly employees (step 1620). Thereafter, the process continues to step 1360 of FIG. 13.

Figure 17:
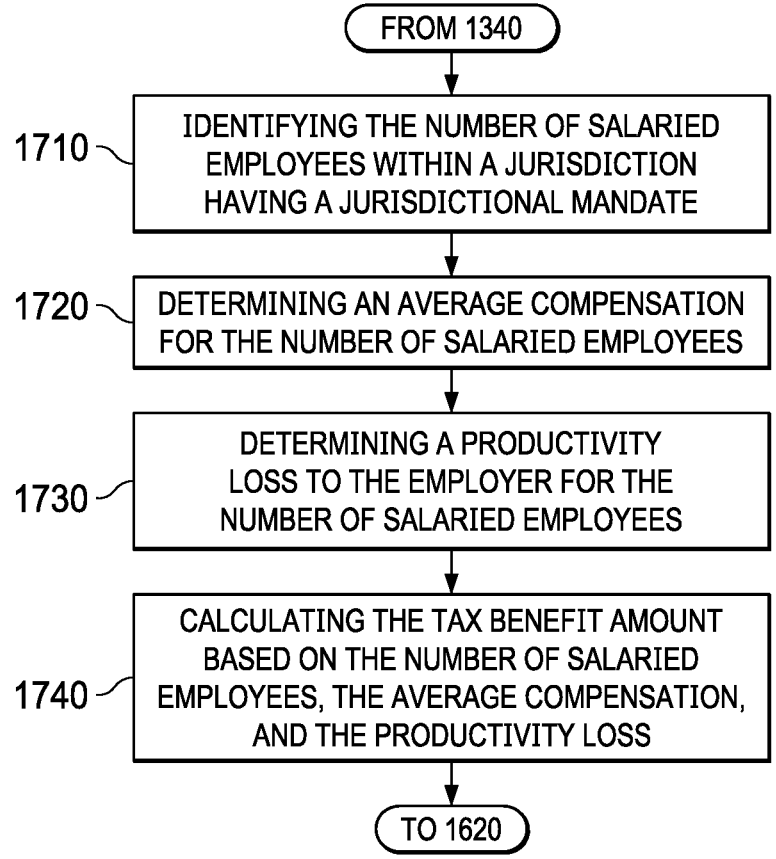
FIG. 17 a flowchart of a process for calculating a first portion of a tax incentive is depicted in accordance with an illustrative embodiment.

With reference next to FIG. 17, a flowchart of a process for calculating a first portion of a tax incentive is depicted in accordance with an illustrative embodiment. The process in FIG. 17 is an example one implementation for step 1610 in FIG. 16.

The process identifies the number of salaried employees within a jurisdiction having a jurisdictional mandate (step 1710). The process determines an average compensation for the number of salaried employees (step 1720). The process determines a productivity loss to the employer for the number of salaried employees (step 1730). The process calculates the tax incentive amount based on the number of salaried employees, the average compensation, and the productivity loss (step 1740). Thereafter, the process may continue to step 1620 of FIG. 16.

Figure 18:
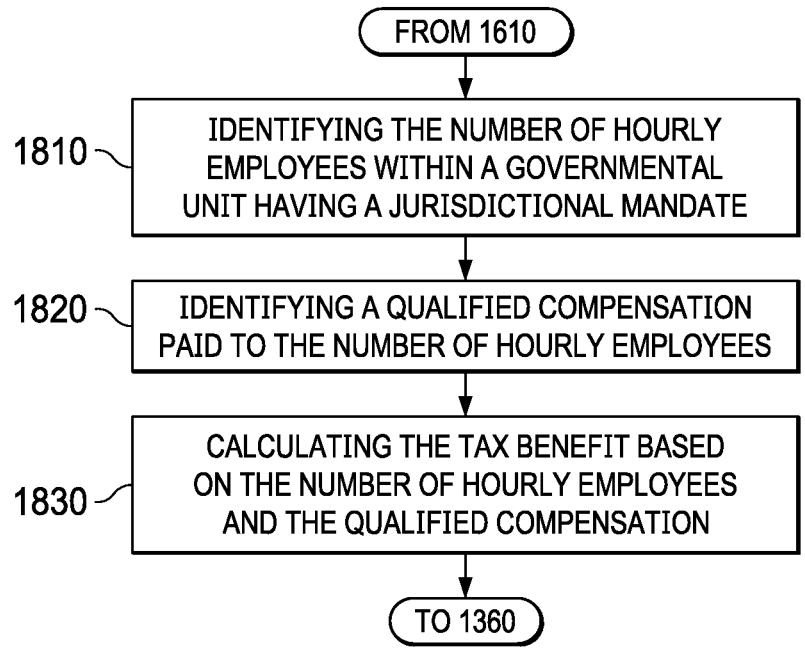
FIG. 18 a flowchart of a process for calculating a second portion of the tax incentive is depicted in accordance with an illustrative embodiment.

With reference next to FIG. 18, a flowchart of a process for calculating a second portion of the tax incentive is depicted in accordance with an illustrative embodiment. The process in FIG. 18 is an example one implementation for step 1620 in FIG. 16.

The process identifies the number of hourly employees within a governmental unit having a jurisdictional mandate (step 1810). The process identifies a qualified compensation paid to the number of hourly employees (step 1820). The process calculates the tax incentive based on the number of hourly employees and the qualified compensation (step 1830). Thereafter, the process may continue to step 1360 of FIG. 13.

Figure 19:
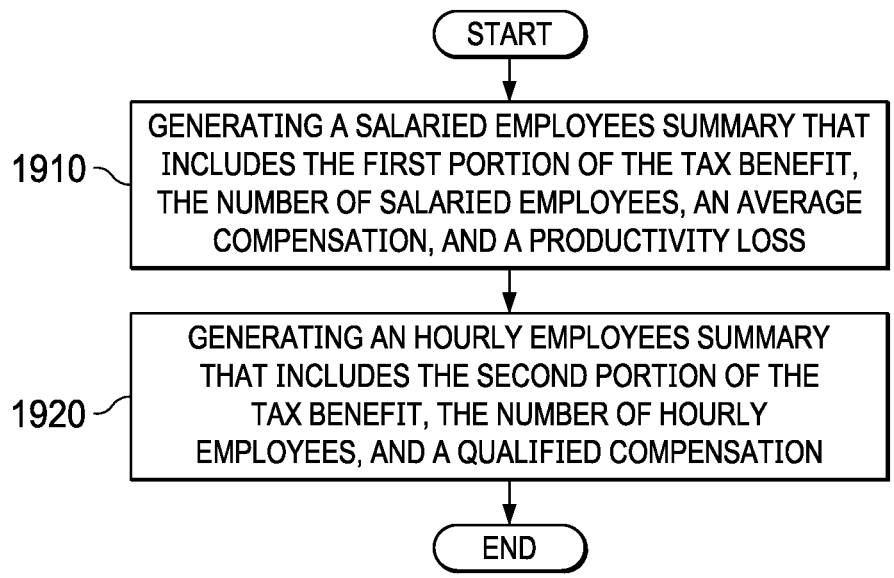
FIG. 19 a flowchart of a process for generating a document for claiming a tax incentive is depicted in accordance with an illustrative embodiment.

With reference next to FIG. 19, a flowchart of a process for generating a document for claiming a tax incentive is depicted in accordance with an illustrative embodiment. The process in FIG. 19 is an example one implementation for step 1360 in FIG. 13.

The process generates a salaried employees summary that includes the first portion of the tax incentive, the number of salaried employees, an average compensation, and a productivity loss (step 1910).

The process generates an hourly employees summary that includes the second portion of the tax incentive, the number of hourly employees, and a qualified compensation (step 1920). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 20:
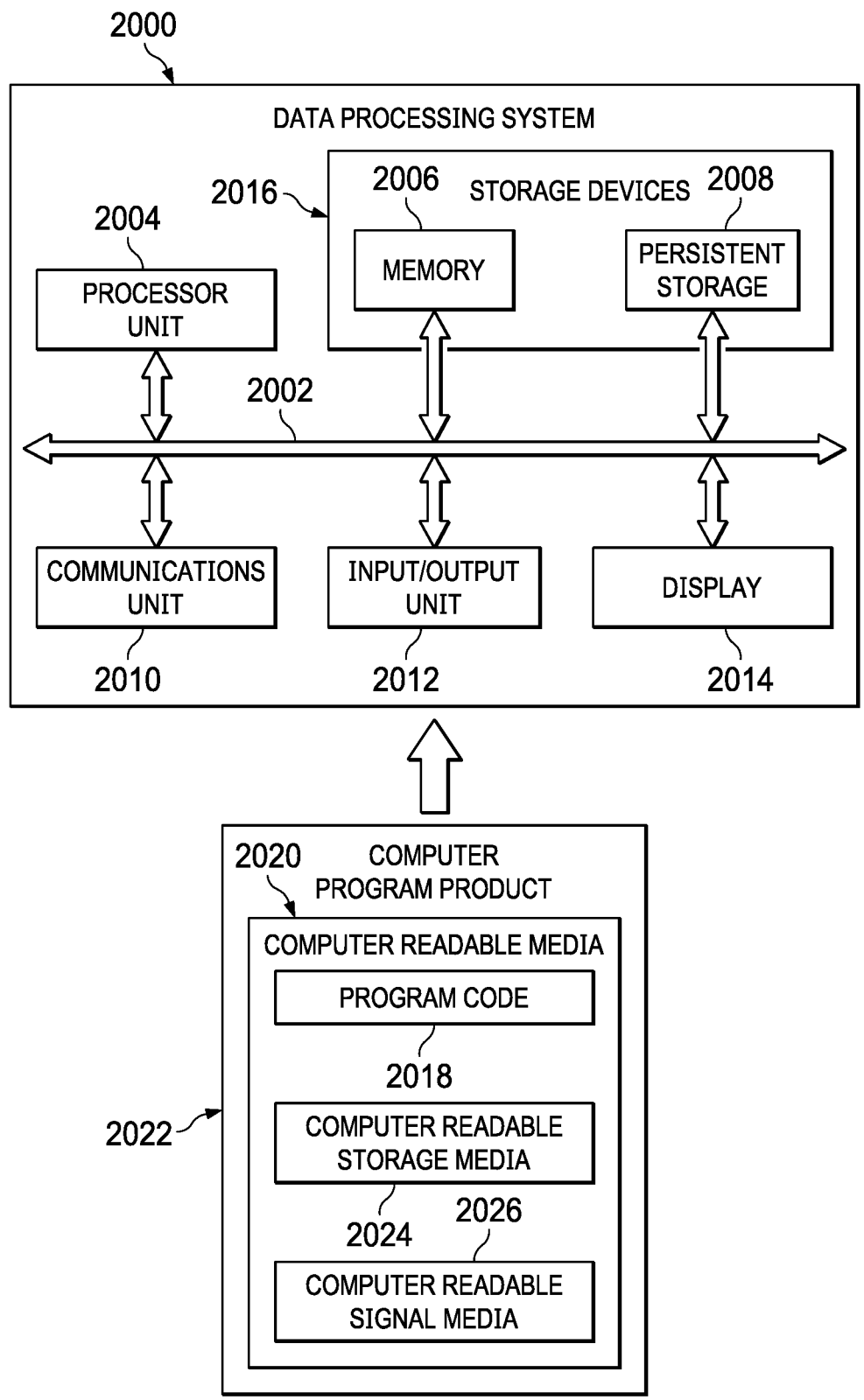
FIG. 20 is a block diagram of a data processing system in accordance with an illustrative embodiment.

Turning now to FIG. 20, a block diagram of a data processing system is depicted in accordance with an illustrative embodiment. Data processing system 2000 can be used to implement server computer 104, server computer 106, client devices 110, in FIG. 1. Data processing system 2000 can also be used to implement computer system 204 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 may take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 may provide a connection for user input through at least one of a keyboard, a mouse, or some other suitable input device. Further, input/output unit 2012 may send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which may be located in a memory, such as memory 2006.

These instructions are program instructions and are also referred are referred to as program code, computer usable program code, or computer-readable program code that can be read and executed by a processor in processor unit 2004.

The program code in the different embodiments can be embodied on different physical or computer-readable storage media, such as memory 2006 or persistent storage 2008.

Program code 2018 is located in a functional form on computer-readable media 2020 that is selectively removable and can be loaded onto or transferred to data processing system 2000 for execution by processor unit 2004. Program code 2018 and computer-readable media 2020 form computer program product 2022 in these illustrative examples. In the illustrative example, computer-readable media 2020 is computer-readable storage media 2024.

In these illustrative examples, computer-readable storage media 2024 is a physical or tangible storage device used to store program code 2018 rather than a medium that propagates or transmits program code 2018. Computer-readable storage media 2024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 2018 can be transferred to data processing system 2000 using a computer-readable signal media. The computer-readable signal media are signals and can be, for example, a propagated data signal containing program code 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 2018 can be located in computer-readable media 2020 in the form of a single storage device or system. In another example, program code 2018 can be located in computer-readable media 2020 that is distributed in multiple data processing systems. In other words, some instructions in program code 2018 can be located in one data processing system while other instructions in program code 2018 can be located in one data processing system. For example, a portion of program code 2018 can be located in computer-readable media 2020 in a server computer while another portion of program code 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, may be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program code 2018.

Thus, the illustrative embodiments of the present invention provide a computer-implemented method, computer system, and computer program product for determining a tax incentive for an employer. A set of cards is displayed on the storyboard interface set of cards. Each card of the set of cards is related to a particular criterion of a set of criteria for determining and eligibility of the employer for the tax incentive. In response to receiving a selection of a particular card, a set of modal windows is displayed on the storyboard interface. The set of modal windows include a set of data fields that are relevant to a particular criterion. Information for the employer is identified that is relevant to the particular criterion. The set of data fields it is populated based on a portion of the information. A tax incentive amount is calculated based on the portion of the information. A document it is generated for claiming the tax incentive. The document including the portion of the employer information and the incentive amount.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for determining a tax incentive for an employer, the method comprising:
    displaying, by one or more processors coupled with memory, a set of cards in a first window on a graphical user interface, wherein each card of the set of cards is related to a particular criterion of a set of criteria for determining an eligibility of the employer for the tax incentive;
    responsive to receiving a selection of a particular card, disabling, by the one or more processors, the first window from the graphical user interface to allow one or more subsequent windows to partially overlay over the first window;
    responsive to disabling the first window, sequentially displaying, by the one or more processors, a set of modal windows over the disabled first window on the graphical user interface, wherein the set of modal windows include a set of data fields that are relevant to the particular criterion, and wherein the disabled first window is visible through the set of modal windows;

identifying, by the one or more processors, information for the employer that is relevant to the particular criterion from one or more disparate sources, wherein the information comprises a first portion of the information and a second portion of the information;

determining, by the one or more processors, responsive to identifying the information and based on the first portion of the information comprising a jurisdictional mandate and the second portion of the information comprising a location of operations of the employer, an overlap of the first portion of the information with the second portion of the information;

displaying, by the one or more processors, the overlap of the first portion of the information with the second portion of the information in a first modal window of the set of modal windows;

populating, by the one or more processors responsive to determining the overlap, the set of data fields, based on the overlap of the first portion of the information with the second portion of the information, wherein the set of populated data fields comprises an eligibility date and employee data;

displaying, by the one or more processors, the set of data fields in a second modal window of the set of modal windows;

determining, by the one or more processors, an average compensation and a productivity loss to the employer based on the eligibility date and the employee data;

automatically calculating, by the one or more processors, responsive to determining the average compensation and the productivity loss, a tax incentive amount based on the second portion of the information, the average compensation, and the productivity loss;

displaying, by the one or more processors responsive to determining the tax incentive amount, the employee data and the tax incentive amount in a third modal window of the set of modal windows;

generating, by the one or more processors, a document for claiming the tax incentive from the third modal window, the document including the employee data and the tax incentive amount;

controlling, by the one or more processors, responsive to generating the document, the third modal window to display over at least one of the first modal window, the second modal window, or the first window; and controlling, by the one or more processors, responsive to a selection of one of the set of modal windows, an arrangement of the set of modal windows including enabling or disabling display of at least one of the first modal window, the second modal window, or the third modal window according to the selection.

2. The method of claim 1, wherein the set of criteria includes an eligible employer criterion and a qualified wage criterion, and wherein the information that is relevant to the particular criterion is selected from a group consisting of payroll information, human resources information, operational information, the jurisdictional mandate, and combinations thereof.

3. The method of claim 2, wherein the set of modal windows is relevant to the eligible employer criterion, and wherein populating the set of data fields further comprises:
    populating, by the one or more processors, the eligibility date for the tax incentive based on the jurisdictional mandate;
    populating, by the one or more processors, work locations for the employer based on the human resources information; and
    populating, by the one or more processors, the employee data based on the payroll information and the human resources information.

4. The method of claim 2, wherein displaying the set of modal windows further comprises:
    displaying, by the one or more processors, a political map for a set of governmental units; and
    distinguishing, by the one or more processors, particular governmental units based on an overlap of the operational information and the jurisdictional mandate.

5. The method of claim 2, wherein calculating the tax incentive further comprises:
    calculating, by the one or more processors, a first portion of the tax incentive based on a number of salaried employees; and
    calculating, by the one or more processors, a second portion of the tax incentive based on a number of hourly employees.

6. The method of claim 5, wherein calculating the second portion of the tax incentive amount further comprises:
    identifying, by the one or more processors, the number of hourly employees within a governmental unit having the jurisdictional mandate;
    identifying, by the one or more processors, a qualified compensation paid to the number of hourly employees; and
    calculating, by the one or more processors, the tax incentive based on the number of hourly employees and the qualified compensation.

7. The method of claim 5, wherein generating the document for claiming the tax incentive further comprises:
    generating, by the one or more processors, a salaried employees summary that includes the first portion of the tax incentive, the number of salaried employees, the average compensation, and the productivity loss; and
    generating an hourly employees summary that includes the second portion of the tax incentive, the number of hourly employees, and a qualified compensation.

8. The method of claim 1, wherein the document for claiming the tax incentive further comprises an Internal Revenue Service form.

9. A computer system comprising:
    a display system; and
    a hardware processor, in communication with the hardware processor, wherein the hardware processor executes program code:
        to display a set of cards in a first window via a graphical user interface, wherein each card of the set of cards is related to a particular criterion of a set of criteria for determining an eligibility of an employer for a tax incentive;
        responsive to receiving a selection of a particular card, to disable the first window from the graphical user interface;
        responsive to disabling the first window, to display sequentially a set of modal windows over the disabled first window on the graphical user interface, wherein the set of modal windows include a set of data fields that are relevant to the particular criterion, and wherein the disabled first window is visible through the set of modal windows;
        to identify information for the employer that is relevant to the particular criterion from one or more disparate sources, wherein the information comprises a first portion of the information and a second portion of the information;

to determine, responsive to identifying the information, based on the first portion of the information comprising a jurisdictional mandate and the second portion of the information comprising a location of operations of the employer, an overlap of the first portion of the information with the second portion of the information;

to display the overlap of the first portion of the information with the second portion of the information in a first modal window of the set of modal windows;

to populate, responsive to determining the overlap, the set of data fields based on the overlap of the first portion of the information with the second portion of the information, wherein the set of populated data fields comprises an eligibility date and employee data;

to display the set of data fields in a second modal window of the set of modal windows;

to determine an average compensation and a productivity loss to the employer based on the eligibility date and the employee data;

to automatically calculate, responsive to determining the average compensation and the productivity loss, a tax incentive amount based on the second portion of the information, the average compensation, and the productivity loss;

to display, responsive to determining the tax incentive amount, the employee data and the tax incentive amount in a third modal window of the set of modal windows;

to generate a document for claiming the tax incentive from the third modal window, the document including the employee data and the tax incentive amount;

to control, responsive to generating the document, the third modal window to display over at least one of the first modal window, the second modal window, or the first window; and to control, responsive to a selection of one of the set of modal windows, an arrangement of the set of modal windows including enabling or disabling display of at least one of the first modal window, the second modal window, or the third modal window according to the selection.

10. The computer system of claim 9, wherein the set of criteria includes an eligible employer criterion and a qualified wage criterion, and wherein the information that is relevant to the particular criterion is selected from a group consisting of payroll information, human resources information, operational information, the jurisdictional mandate, and combinations thereof.

11. The computer system of claim 10, wherein the set of modal windows is relevant to the eligible employer criterion, and wherein in populating the set of data fields, the hardware processor further executes program code:
to populate eligibility date for the tax incentive based on the jurisdictional mandate;
to populate work locations for the employer based on the human resources information; and
to populate the employee data based on the payroll information and the human resources information.

12. The computer system of claim 10, wherein in displaying the set of modal windows, the hardware processor further executes program code:
to display a political map for a set of governmental units; and
to distinguish particular governmental units based on an overlap of the operational information and the jurisdictional mandate.

13. The computer system of claim 10, wherein in calculating the tax incentive, the hardware processor further executes program code:
to calculate a first portion of the tax incentive based on a number of salaried employees; and
to calculate a second portion of the tax incentive based on a number of hourly employees.

14. The computer system of claim 13, wherein in calculating the second portion of the tax incentive amount, the hardware processor further executes program code:
to identify the number of hourly employees within a governmental unit having the jurisdictional mandate;
to identify a qualified compensation paid to the number of hourly employees; and
to calculate the tax incentive based on the number of hourly employees and the qualified compensation.

15. The computer system of claim 13, wherein in generating the document for claiming the tax incentive, the hardware processor further executes program code:
to generate a salaried employees summary that includes the first portion of the tax incentive, the number of salaried employees, the average compensation, and the productivity loss; and
to generate an hourly employees summary that includes the second portion of the tax incentive, the number of hourly employees, and a qualified compensation.

16. The computer system of claim 9, wherein the document for claiming the tax incentive further comprises an Internal Revenue Service form.

17. A computer program product comprising:
a computer readable storage media; and
program code, stored on the computer readable storage media, for determining a tax incentive, the program code comprising:
program code for displaying a set of cards in a first window via a graphical user interface, wherein each card of the set of cards is related to a particular criterion of a set of criteria for determining an eligibility of an employer for the tax incentive;
program code for disabling the first window from the graphical user interface in response to receiving a selection of a particular card;
program code for sequentially displaying a set of modal windows over the disabled first window on the graphical user interface in response to disabling the first window, wherein the set of modal windows include a set of data fields that are relevant to the particular criterion, and wherein the disabled first window is visible through the set of modal windows;
program code for identifying information for the employer that is relevant to the particular criterion from one or more disparate sources, wherein the information comprises a first portion of the information and a second portion of the information;
program code for determining, responsive to identifying the information, based on the first portion of the information comprising a jurisdictional mandate and a second portion of the information comprising a location of operations of the employer, an overlap of the first portion of the information with the second portion of the information;

program code for displaying the overlap of the first portion of the information with the second portion of the information in a first modal window of the set of modal windows;

program code for populating, responsive to determining the overlap, the set of data fields based on the overlap of the first portion of the information with the second portion of the information, wherein the set of populated data fields comprises an eligibility date and employee data;

program code for displaying the set of data fields in a second modal window of the set of modal windows;

program code for determining an average compensation and a productivity loss to the employer based on the eligibility date and the employee data;

program code for automatically calculating, responsive to determining the average compensation and the productivity loss, a tax incentive amount based on the second portion of the information, the average compensation, and the productivity loss;

program code for displaying, responsive to determining the tax incentive amount, the employee data and the tax incentive amount in a third modal window of the set of modal windows;

program code for generating a document for claiming the tax incentive from the third modal window, the document including the employee data and the tax incentive amount;

program code for controlling, responsive to generating the document, the third modal window to display over at least one of the first modal window, the second modal window, or the first window; and program code for controlling, responsive to a selection of one of the set of modal windows, an arrangement of the set of modal windows including enabling or disabling display of at least one of the first modal window, the second modal window, or the third modal window according to the selection.

18. The computer program product of claim 17, wherein the set of criteria includes an eligible employer criterion and a qualified wage criterion, and wherein the information that is relevant to the particular criterion is selected from a group consisting of payroll information, human resources information, operational information, the jurisdictional mandate, and combinations thereof.

19. The computer program product of claim 18, wherein the set of modal windows is relevant to the eligible employer criterion, and wherein the program code for populating the set of data fields further comprises:

program code for populating eligibility date for the tax incentive based on the jurisdictional mandate;

program code for populating work locations for the employer based on the human resources information; and program code for populating the employee data based on the payroll information and the human resources information.

20. The computer program product of claim 18, wherein the program code for displaying the set of modal windows further comprises:

program code for displaying a political map for a set of governmental units; and program code for distinguishing particular governmental units based on an overlap of the operational information and the jurisdictional mandate.

21. The computer program product of claim 18, wherein the program code for calculating the tax incentive further comprises:

program code for calculating a first portion of the tax incentive based on a number of salaried employees; and program code for calculating a second portion of the tax incentive based on a number of hourly employees.

22. The computer program product of claim 21, wherein the program code for calculating the second portion of the tax incentive amount further comprises:

program code for identifying the number of hourly employees within a governmental unit having the jurisdictional mandate;

program code for identifying a qualified compensation paid to the number of hourly employees; and program code for calculating the tax incentive based on the number of hourly employees and the qualified compensation.

23. The computer program product of claim 21, wherein the program code for generating the document for claiming the tax incentive further comprises:

program code for generating a salaried employees summary that includes the first portion of the tax incentive, the number of salaried employees, the average compensation, and the productivity loss;

program code for generating an hourly employees summary that includes the second portion of the tax incentive, the number of hourly employees, and a qualified compensation.

24. The computer program product of claim 17, wherein the document for claiming the tax incentive further comprises an Internal Revenue Service form.

* * * * *